United States Patent
Büttner et al.

(10) Patent No.: US 8,628,100 B2
(45) Date of Patent: Jan. 14, 2014

(54) STABILIZING DEVICE FOR STEERED TRAILING AXLES OF VEHICLES

(75) Inventors: Josef Büttner, Waldaschaff (DE); Lutz Böhme, Sailauf (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 13/321,085

(22) PCT Filed: May 11, 2010

(86) PCT No.: PCT/EP2010/056498
§ 371 (c)(1), (2), (4) Date: Dec. 13, 2011

(87) PCT Pub. No.: WO2010/133486
PCT Pub. Date: Nov. 25, 2010

(65) Prior Publication Data
US 2012/0091678 A1    Apr. 19, 2012

(30) Foreign Application Priority Data

May 19, 2009 (DE) .......................... 10 2009 003 248

(51) Int. Cl.
*B62D 7/22* (2006.01)
(52) U.S. Cl.
USPC ........... 280/89; 280/90; 267/34; 267/69; 188/304; 188/312
(58) Field of Classification Search
USPC ............. 280/89, 90; 267/70, 33, 34, 69, 221, 267/286, 287; 188/304, 312
See application file for complete search history.

(56) References Cited

U.S. PATENT DOCUMENTS

| 1,273,059 | A | * | 7/1918 | Hild | 188/312 |
| 2,029,829 | A | * | 2/1936 | Messier | 188/312 |
| 3,368,697 | A | * | 2/1968 | Carlson | 213/40 R |
| 3,376,795 | A | * | 4/1968 | Allen | 92/130 R |
| 3,638,885 | A | * | 2/1972 | Reed | 244/17.27 |
| 4,036,335 | A | * | 7/1977 | Thompson et al. | 188/282.9 |
| 4,591,177 | A | | 5/1986 | Perlini | |
| 4,822,012 | A | * | 4/1989 | Sketo | 267/221 |

(Continued)

FOREIGN PATENT DOCUMENTS

| DE | 19510208 | 9/1996 |
| DE | 19716150 | 10/1998 |

(Continued)

OTHER PUBLICATIONS

International Search Report.

*Primary Examiner* — Nicole Verley
(74) *Attorney, Agent, or Firm* — Price Heneveld LLP (57) ABSTRACT

A stabilizing device for axles of vehicles, such as motor vehicles, trailers, semi-trailers, or the like, including a hollow cylinder unit, which comprises a hollow cylinder containing a fluid therein, a piston unit with a piston which is arranged in the hollow cylinder and divides the hollow cylinder into at least two chambers, wherein the piston unit can slide relative to the hollow cylinder unit in that said piston unit can be moved from an original position to a deflected position, a pre-tensioning device which tensions the piston unit in the direction of the original position, and a control or regulating device which controls or regulates the fluid flow into/out of the chambers.

19 Claims, 7 Drawing Sheets

(56) References Cited

U.S. PATENT DOCUMENTS

| | | | | |
|---|---|---|---|---|
| 4,925,165 | A | * | 5/1990 | Sketo ............................ 267/221 |
| 4,981,199 | A | * | 1/1991 | Tsai ............................... 188/312 |
| 5,816,594 | A | * | 10/1998 | Howard .......................... 280/90 |
| 6,216,831 | B1 | * | 4/2001 | Taylor ........................... 188/280 |
| 6,454,206 | B2 | * | 9/2002 | Vincent ...................... 244/17.27 |
| 6,681,883 | B2 | * | 1/2004 | Loh et al. ...................... 180/417 |
| 7,017,893 | B1 | * | 3/2006 | Vincenzo F. ................... 267/226 |
| 7,314,124 | B2 | * | 1/2008 | Martyn et al. ................. 188/318 |
| 7,318,592 | B2 | * | 1/2008 | Iwamoto et al. ................ 280/90 |
| 7,478,708 | B2 | * | 1/2009 | Bugaj ........................... 188/304 |
| 7,575,110 | B2 | * | 8/2009 | Yoshimoto .................... 188/312 |
| 8,177,043 | B2 | * | 5/2012 | Kamiya et al. ............. 188/322.2 |

FOREIGN PATENT DOCUMENTS

| | | | |
|---|---|---|---|
| DE | 19803745 | | 8/1999 |
| DE | 10019778 | | 10/2001 |
| DE | 10326384 | | 12/2004 |
| DE | 60115068 | | 7/2006 |
| DE | 602005006311 | | 5/2009 |
| EP | 0845403 | | 6/1998 |
| JP | 60113711 A | * | 6/1985 ............. B60G 17/06 |
| WO | 8907065 | | 8/1989 |
| WO | 2008040957 | | 4/2008 |

2004/0145098 A1 * 7/2004 Thaler ............................ 267/33

* cited by examiner

STABILIZING DEVICE FOR STEERED TRAILING AXLES OF VEHICLES

BACKGROUND OF THE INVENTION

The present application relates to a stabilizing device for axles of vehicles, such as motor vehicles, trailers, semi-trailers or the like.

Stabilizing devices of the type in question are known from the prior art. Such stabilizing devices are provided between the axle body and a part which is deflectable in correspondence with the wheels, such as a tie rod. Such a stabilizing device is known from DE 197 16 150 A1, for example. During cornering or during overtaking, a lateral force is generated in the tire contact area. Said lateral forces (to the left and to the right) create a steering torque which acts on the steering arm and forces it into angularity. For a synchronous rotatory motion between the left and the right steering arm there is provided a tie rod. Here, the stabilizing device is attached at the one side to the axle body and at the other side to the tie rod so that the wheels are returned to their original or zero position in a damped manner. If the vehicle is to be moved backwards, it is necessary to fix the wheel in the original position, to which end pneumatic or mechanical reverse gear locks are additionally used in the prior art. However, a problem of such systems is that they consist of a plurality of individual assemblies, which leads to a great demand for available space and high manufacturing costs.

Therefore, the object underlying the present invention is to provide a stabilizing device for the axles of vehicles as well as a steered trailing axle of vehicles, such as motor vehicles, trailers, semi-trailers or the like, which is designed flexibly, which is capable of fulfilling the functions of steering stabilization and reverse gear lock or steering lock when there is little space available and at low manufacturing costs.

SUMMARY OF THE INVENTION

According to the invention there is provided a stabilizing device for axles of vehicles, such as motor vehicles, trailers, semi-trailers or the like, comprising a hollow cylinder unit with a hollow cylinder containing a fluid therein, a piston unit with a piston which is arranged in the hollow cylinder and divides the hollow cylinder into at least two chambers, wherein the piston unit can slide relative to the hollow cylinder unit in that said piston unit can be moved from an original position to a deflected position, a pre-tensioning device which pre-tensions the piston unit in the direction of the original position, and a control or regulating device which controls or regulates the fluid flow into/out of the expansion chambers. The stabilizing device is provided in particular in order to ensure steering stabilization during the travel operation. During cornering or during overtaking, a lateral force is generated in the tire contact area. By means of the steering stabilization, the stabilizing device is equally or symmetrically stressed during cornering in either direction and, thus, during cornering a corresponding restoring force opposite to the direction of deflection is generated. As a result, a reliable defined centering is achieved in the straightforward travel direction with simple constructional and low-wear measures. The stabilizing device expediently consists of a hollow cylinder unit which is provided with a hollow cylinder. In the hollow cylinder, there is provided a fluid such as a gas or a liquid. Particularly advantageously, the fluid of the hollow cylinder is a hydraulic liquid such as a hydraulic oil. Furthermore, the stabilizing device comprises a piston unit with a piston which is accommodated in the hollow cylinder. The piston has a geometric configuration such that its cross-section corresponds essentially to the inner cross-section of the hollow cylinder and divides the same into at least two chambers. Here, the piston unit can slide relative to the hollow cylinder unit along a longitudinal axis or longitudinal extension of the stabilizing device by moving it from an original position or central position or zero position to a deflected position. During this displacement, there is a fluid flow in the other chamber due to the movement of the piston. To this end, either the piston comprises a valve device and/or the hollow cylinder comprises a corresponding valve device for the fluid exchange or fluid communication. Advantageously, the stabilizing device comprises a pre-tensioning device which tensions the piston unit in the direction of the original position. Thus, by means of the pre-tensioning device a restoring torque is exerted via the hollow cylinder unit or the piston unit onto the deflectable part of the axle, which torque causes the wheels of the axle to move back in the direction of the original position or the straightforward direction. Expediently, a control or regulating device is provided which controls or regulates the fluid flow into/out of the chambers. By means of the control or regulating device it is in particular possible to allow or block the fluid flow as well as preferably to control or regulate the velocity and/or amount of the fluid flow. As a result, it is advantageously possible to use the stabilizing device according to the invention not only as a steering stabilization device but also as reverse gear lock or steering lock since it is possible to fix or determine the position or the steering angle of the wheels by blocking the fluid flow.

Advantageously, the deflected position comprises a retracted and an extended position. To put it differently, displacing the piston unit relative to the hollow cylinder unit from the original position to the deflected position leads to a change in the length of the stabilizing device or to a change in the distance between the outer ends of the stabilizing device. In the retracted position, the stabilizing device—seen in the longitudinal direction—has a shorter length than in the original position, and in the extended position it has a larger length than in the original position.

Advantageously, the stabilizing device further comprises a sensor device which detects the position of the piston unit. In particular, the sensor device is provided in order to capture or detect whether the piston unit is in the original position relative to the hollow cylinder unit. Here, the sensor device particularly expediently detects the position of a portion of a piston rod of the piston unit protruding from the hollow cylinder. The sensor device is expediently configured such that it detects said two states or differentiates between two states, respectively, namely the position of the piston unit in the original position and a position deflected therefrom. In a preferred embodiment, the sensor device may also detect the degree of deflection, i.e. the degree of displacement of the piston unit away from the original position.

Preferably, the control or regulating device comprises a valve arrangement by means of which the fluid flow into/out of the chambers may be permitted or prevented. Thus, the valve arrangement advantageously is designed such that it blocks or permits the fluid flow depending on a signal of the control or regulating device. Here, the valve arrangement may be provided in or at the piston of the piston unit. Particularly advantageously however, the valve arrangement is formed at the hollow cylinder of the hollow cylinder unit and regulates or controls the fluid flow into and out of the chambers.

Preferably, the control or regulating device is configured such that it prevents the fluid flow into/out of the chambers only when the sensor device detects the original position of the piston unit. Thus, the control or regulating device comprises a regulating member which blocks the fluid flow into and out of the chambers when the sensor device captures or detects that the piston unit is in the original position. This ensures that the fluid flow is only blocked when the wheels of the vehicle are oriented in the zero position. This ensures that the vehicle reverses safely since the stabilizing device serves as a steering lock or reverse gear lock in this case. The sensor device may indirectly or directly or immediately detect the original position of the piston unit. The indirect detection of the original position of the piston unit may occur for example by detecting the zero position of the pre-tensioning device, for example the original position of the first and the second holding element. In the original position of the piston unit, the fluid flow into/out of the chambers is not necessarily prevented, but only when the control or regulating device transmits a corresponding signal to the valve arrangement. The control or regulating device or its regulating member, respectively, is thus configured such that a corresponding signal can be transmitted to the valve arrangement only when the sensor device detects the original position of the piston unit. As a rule, signaling of the regulating member of the control or regulating device occurs only when the vehicle is made to reverse.

In a preferred embodiment, the control or regulating device comprises a fluid pump which is configured to selectively feed the fluid to one of the chambers in order to displace the piston unit into a predetermined position. This determines or fixes or adjusts a position of the piston unit and, thus, an angularity of the wheels of the vehicle so that the stabilizing device may act as steering in a preferred embodiment. Advantageously, the stabilizing device thus, on the one hand, fulfills the function of steering stabilization and, on the other hand, the function of a steering lock when the vehicle is reversed and, third, it fulfills the function of an (active) steering during the travel operation of the vehicle. Contrary to the systems known from the state of the art, where the function of steering stabilization and the function of the (active) steering during the travel operation of the vehicle are fulfilled by separate, individual systems, the function of steering stabilization and (active) steering during the travel operation of the vehicle are realized in a single or integral constructional unit in the preferred embodiment of the stabilizing device.

Advantageously, the sensor device is configured to detect the zero position of the pre-tensioning device. To put it differently, the sensor device may comprise one or several sensors which are configured to detect the position and/or the state of the pre-tensioning device. The zero position of the pre-tensioning device thus is that state in which the pre-tensioning device is subject to the least load. In a particularly preferred embodiment, when the piston unit is moved relative to the hollow cylinder unit, the pre-tensioning device is braced or loaded by a first and second holding element. In such an embodiment, the sensor(s) of the sensor device may also detect the original position of the first and second holding element.

In a preferred embodiment, the pre-tensioning device comprises a spring element which preferably is configured as a coil spring. The pre-tensioning device thus may expediently be formed as an elastic element. To this end, in particular a gas spring or a rubber element is suitable. Particularly expediently however, the pre-tensioning device is configured as a torsion spring or coil spring. Particularly advantageously, the pre-tensioning device or the spring element, respectively, is configured concentric or coaxial to the hollow cylinder unit or the hollow cylinder, respectively. Here, the spring element and the hollow cylinder, seen in the longitudinal direction, may entirely or partially overlap, wherein the spring element surrounds the hollow cylinder. Alternatively, the spring element and the hollow cylinder may be spaced apart from each other or be adjacent to each other, however without overlapping.

Expediently, the spring element is subject to pressure load in each of the deflected positions. To put it differently, the pressure load on the spring elements increases when the piston unit is moved from the original position to a deflected position, both in the direction of the retracted position and in the direction of the extended position.

Advantageously, in the retracted position, the position of a first end of the spring element is displaced relative to the hollow cylinder unit and, in the extended position, the position of a second end of the spring element is displaced relative to the hollow cylinder unit. To put it differently, when one end of the spring element is displaced, the respective other end of the spring element remains stationary relative to the hollow cylinder unit. Here, the displacement takes place along the longitudinal axis of the stabilizing device and expediently towards the other end of the spring element since the spring element preferably is subjected to pressure load. Particularly preferably, when the piston unit is displaced in the direction of the retracted position, the end of the spring element facing the free end of the piston unit is displaced, and when the piston unit is displaced in the direction of the retracted position, the end of the spring element opposite the free end of the piston unit is displaced.

Preferably, the piston unit comprises a piston rod on which the piston is arranged and which at least at one end protrudes from the hollow cylinder. Here, the piston expediently is arranged or fixed stationarily on the piston rod. Preferably, the piston rod protrudes coaxially or concentrically in the axial direction at one end face of the hollow cylinder unit or of the hollow cylinder, respectively. In a preferred embodiment, the piston rod may also protrude from the hollow cylinder at two opposite end faces thereof, wherein at one side or at a first end of the piston rod there is provided a fastening portion for an undercarriage member of the vehicle, and at the opposite second end of the piston rod there may be provided a holding section as is described hereinafter.

Expediently, at the protruding section of the piston rod there is provided a holding section which, when the piston unit is displaced in the direction of the retracted position, is adapted to interact with a first holding element which is in engagement with the pre-tensioning unit, and, when the piston unit is displaced in the direction of the extended position, with a second holding element which is in engagement with the pre-tensioning unit. Advantageously, the holding section may be provided outside of the hollow cylinder in a portion provided between the piston and the first or free end of the piston rod. In a preferred embodiment, however, a second end of the piston rod, which end is opposite of the first end, protrudes from the hollow cylinder, at which the holding section may be arranged. The first and the second holding element are essentially formed as clamps or clips, wherein between said clamps or clips the pre-tensioning device is braced at a certain basic tension. When the piston unit or the holding section thereof, respectively, is displaced, the one holding element is displaced relative to the other holding element along the longitudinal axis of the stabilizing device so that the pre-tensioning device or the spring element, respectively, is further compressed. In the displaced state, the holding section is in engagement only with one of the holding elements, wherein there is no engagement with the remaining holding element. There is a two-sided engagement, i.e. an engagement of both holding elements with the holding section, only when the piston unit is in its original position.

In a preferred embodiment, the hollow cylinder unit comprises a housing which accommodates the pre-tensioning unit and which preferably is arranged coaxially to the hollow cylinder. The housing may be configured to form a single piece with the hollow cylinder or it may be configured multi-piece and be unreleasably attached to the hollow cylinder. Preferably, the housing may be arranged at the end face facing the first free end of the piston rod. However, particularly advantageously the housing is arranged at that side of the hollow cylinder which faces away from the free end of the piston rod, wherein a fastening section of the hollow cylinder unit is provided at an undercarriage member of the vehicle at the free end face of the housing.

Preferably, the housing and the hollow cylinder overlap at least partially. To put it differently, the housing may at least partially enclose or surround or encase the hollow cylinder. Here, the spring element expediently is arranged between the housing and the hollow cylinder. When the housing and the hollow cylinder overlap, it is possible to increase the length of the spring element in accordance with the length of the overlap. As a result, it is made possible to provide a spring element with a particularly advantageous spring characteristic.

According to the invention there is further provided a steered trailing axle of vehicles, such as motor vehicles, trailers, semi-trailers or the like, comprising an axle body at whose ends wheels can be arranged, a tie rod by means of which the steering forks can be coupled or linked, and a stabilizing device which is effective between the axle body and a part, such as the tie rod, which is deflectable in correspondence with the wheels, wherein the stabilizing device comprises a hollow cylinder unit with a hollow cylinder containing a fluid therein, a piston unit with a piston which is arranged in the hollow cylinder and divides the same into at least two chambers, wherein the piston unit can slide relative to the hollow cylinder in that said piston unit can be moved from an original position to a deflected position, a pre-tensioning device which tensions the piston unit in the direction of the original position, and a control or regulating device, which controls or regulates the fluid flow into/out of the chambers.

The further advantageous and preferred features of the stabilizing device according to the invention may also be employed in the steered trailing axle according to the invention.

Further advantages and features of the invention result from the following description of preferred embodiments with reference to the appended figures, wherein individual features of individual embodiments may be combined to form new embodiments.

DETAILED DESCRIPTION OF THE PREFERRED EMBODIMENTS

Figure 1:
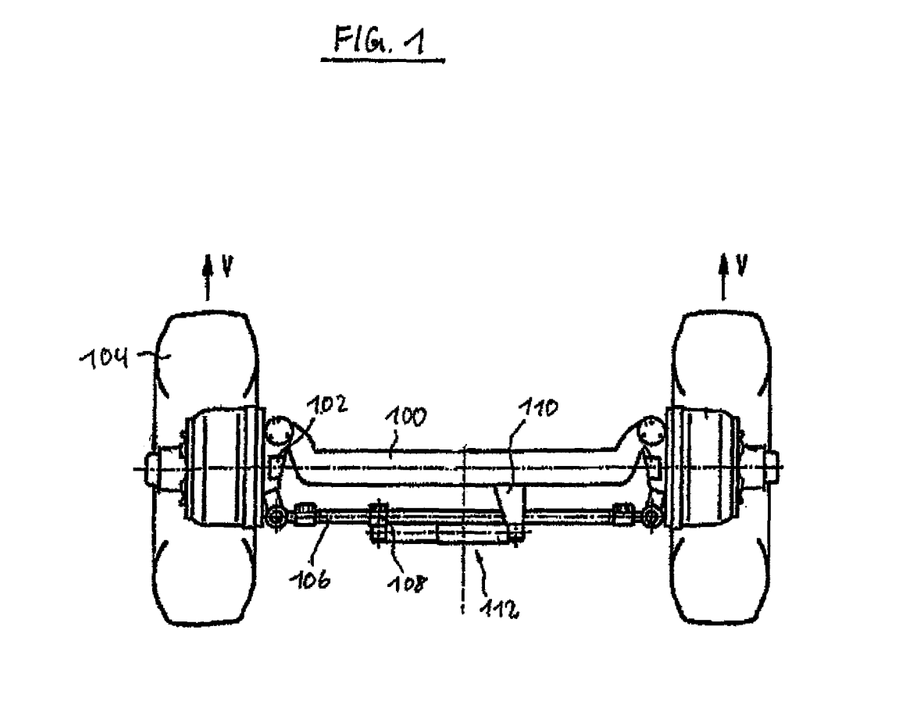
FIG. 1 is a top plan view of an embodiment of the steered trailing axle according to the invention.
Figure 2A:
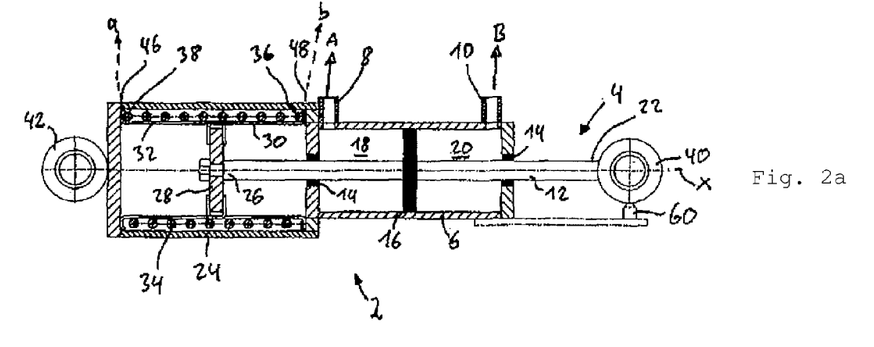
FIG. 2a is a cross-sectional view of a first embodiment of the stabilizing device according to the invention in an original position.

For purposes of description herein, the terms "upper," "lower," "right," "left," "rear," "front," "vertical," "horizontal," and derivatives thereof shall relate to the invention as oriented in FIGS. 1 and 2a. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

FIG. 1 shows a top plan view of the preferred embodiment of the steered trailing axle according to the invention. The steered trailing axle comprises an axle body 100 which extends essentially transverse to the travel direction. Steering forks 102 are hinged at the axle body 100, which steering forks carry the wheels 104. As can be seen, the axle body 100 is cranked at both ends in the forward travel direction V. The steering forks 102 are connected with a tie rod 106 via a hinge joint in order to ensure the parallel positioning of the wheels 104. At the tie rod 106 there is provided a first connection element 108, and at the axle body 100 there is provided a second connection element 110, between which there is arranged a stabilizing device 112 for steering stabilization. As can be seen, the stabilizing device 112 is effective essentially in the longitudinal direction of the axle body 100.

Figure 2B:
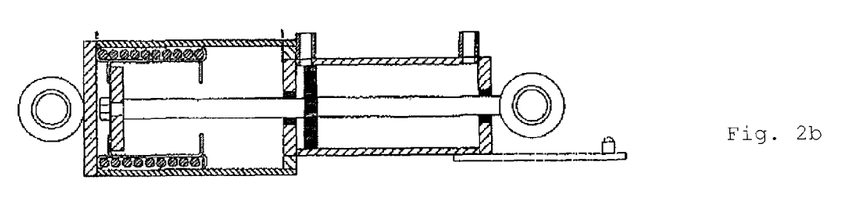
FIG. 2b is a cross-sectional view of the first embodiment of the stabilizing device according to the invention in a retracted position.
Figure 2C:
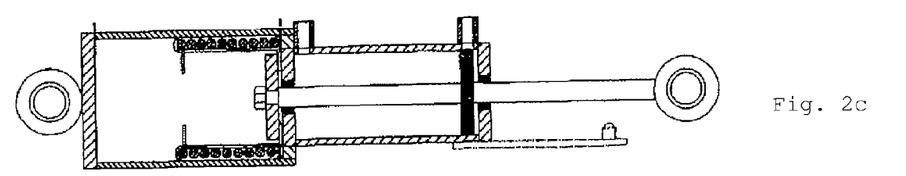
FIG. 2c is a cross-sectional view of the first embodiment of the stabilizing device according to the invention in an extended position.

FIG. 2 shows a first exemplary embodiment of the stabilizing device according to the invention. The stabilizing device comprises a hollow cylinder unit 2 and a piston unit 4.

The hollow cylinder unit 2 comprises a hollow cylinder 6 which is filled with a fluid. At either distal end of the hollow cylinder 6 there is provided a fluid connection 8 and a second fluid connection 10, via which the fluid may be supplied to and fed away from the interior of the hollow cylinder 6.

The piston unit 4 comprises a piston rod 12 which extends through the end walls of the hollow cylinder, sealed by seals 14. Inside of the hollow cylinder 6, the piston rod 12 comprises a piston 16 whose cross-section essentially corresponds to the cross-section of the hollow space of the hollow cylinder 6. Consequently, the piston 16 divides the interior of the hollow cylinder 6 into a first chamber 18 and a second chamber 20, which expediently are separated from each other in a fluid-tight manner.

At an end face of the hollow cylinder 6, which end face is opposite the free or first end 22 of the piston rod 12, there is arranged a housing 24 into which protrudes a second end 26 of the piston rod 12. At the second end 26 there is provided an expediently plate- or disc-shaped holding section 28 at which a first holding element 30 and a second holding element 32 are braced by the pre-tensioning unit which is configured as a spring element 34.

The holding elements 30, 32 are advantageously configured as sheet metal arms and alternatingly distributed along the inner circumference of the spring element 34. Here, a first end 36 of the spring element 34 engages with the first holding element 30, and a second end 38 is in engagement with a second holding element 32.

The stabilizing device 112 is connected to the first connection element 108 of the tie rod 106 via a first fastening element 40. The hollow cylinder unit 2 of the stabilizing device 112 is connected to a second connection element 110 of the axle body 100 via a second fastening element 42. Under load, for example during cornering, a force is exerted onto the piston unit 4 via the tie rod 106 so that the piston unit 4 displaces from the original position shown in FIG. 2a to a deflected position in the direction of the longitudinal axis X. Here, the deflected position may be a retracted position (FIG. 2b) or an extended position (FIG. 2c).

In the retracted position shown in FIG. 2b, the holding section 28 of the piston unit 4 is no longer in engagement with the second holding element 32 since it moves in the direction of the second fastening element 42 and, due to the engagement with the first holding element 30, compresses the spring element 34. Accordingly, the holding section 28 is no longer in engagement with the first holding element 30 when the piston unit 4 is displaced in the direction of the extended position shown in FIG. 2c, while due to the engagement with the second holding element 32 the second end 38 of the spring element 34 moves in the direction away from the second fastening element 42 and, thus, leads to a compression of the spring element 34.

Figure 3:
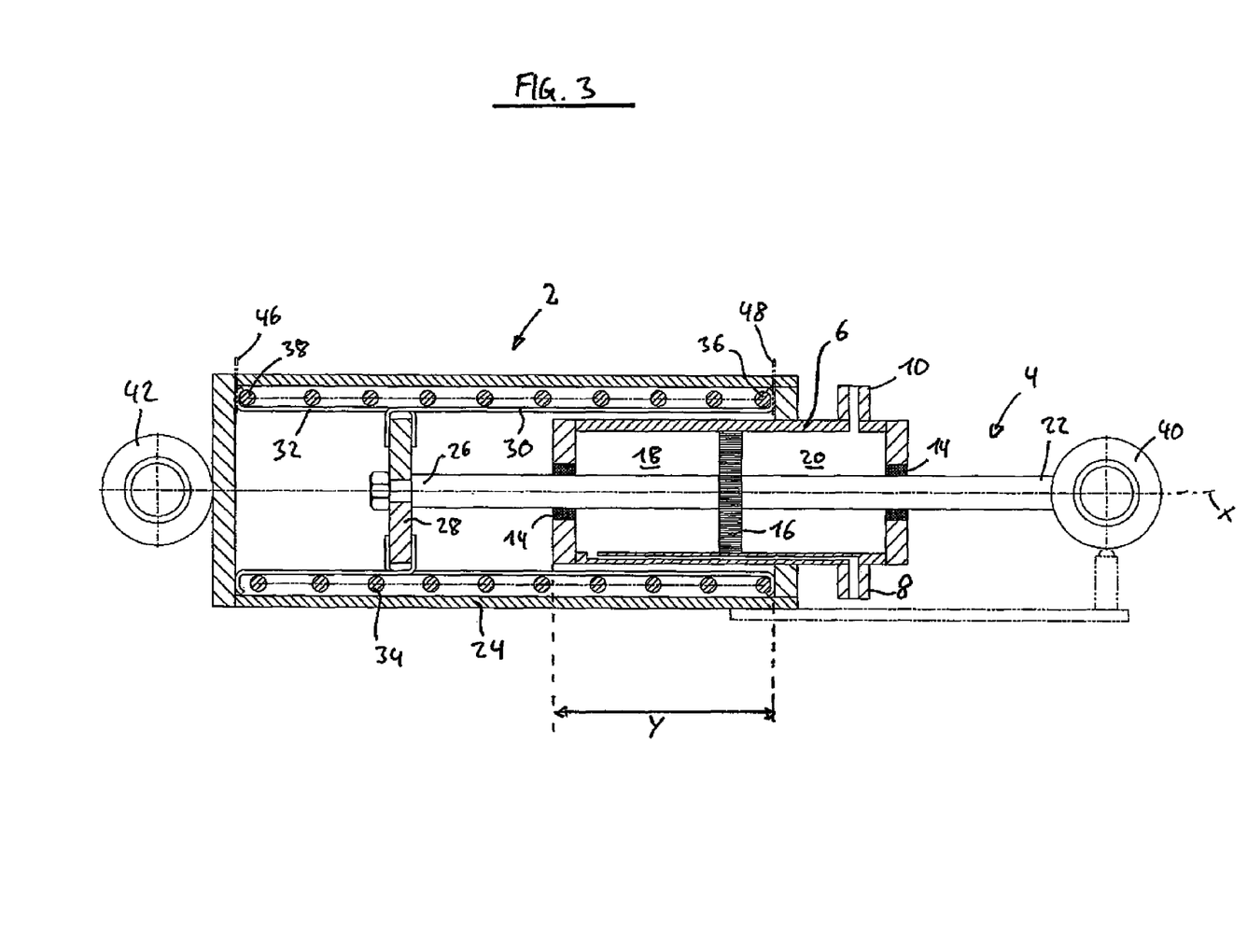
FIG. 3 is a cross-sectional view of a second embodiment of the stabilizing device according to the invention.

FIG. 3 shows a further exemplary form of the stabilizing device according to the invention. It differs from the embodiment shown in FIG. 2 in particular in that the housing 24 and the hollow cylinder 6 of the hollow cylinder unit 2 overlap over the longitudinal extension Y. As a result, it is possible to enlarge the length of the spring element 34 by the longitudinal extension Y so that due to the better spring characteristic an optimized force-displacement curve of the spring element 34 results. Moreover, it becomes thus possible to ensure a more compact design.

Figure 4A:
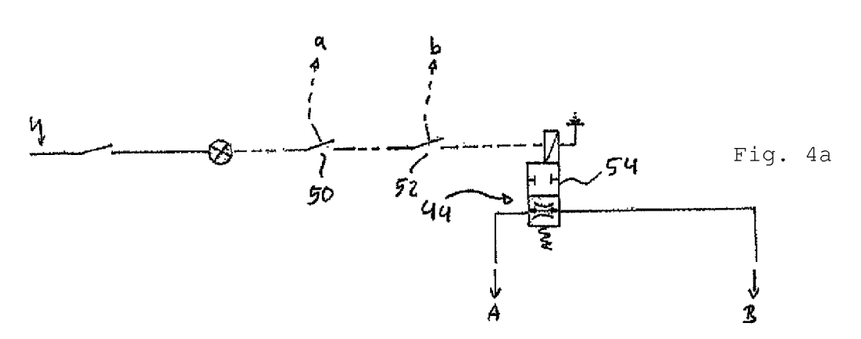
FIG. 4a is a plugging diagram of a first embodiment of the regulating device according to the invention.
Figure 4B:
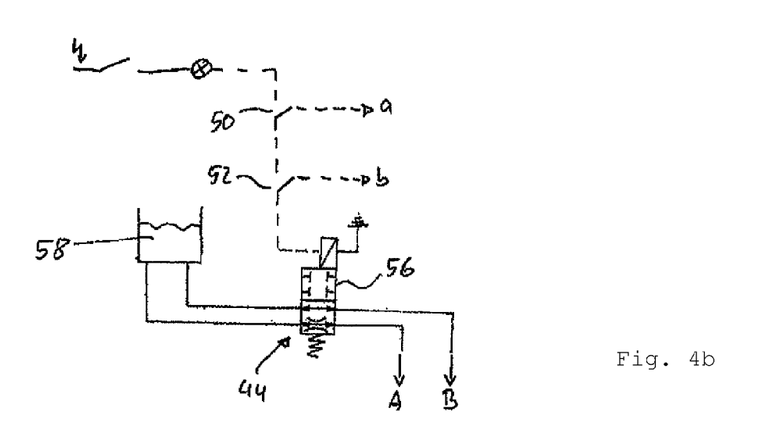
FIG. 4bis a plugging diagram of the first embodiment of the regulating device according to the invention.

FIGS. 4a and 4b show plugging diagrams of an exemplary control or regulating device. Here, there is provided between the first fluid connection 8 and the second fluid connection 10 a valve arrangement 44 by means of which the fluid flow into and out of the chambers 18, 20 may be permitted or blocked. However, it may be blocked only when the sensor device detects the original position of the piston unit 4. To this end, the sensor device comprises a first contact sensor 46 and a second contact sensor 48 which are provided at opposite inner end faces of the housing 24. Only when both the first holding element 30 and the second holding element 32 are in contact with the inner end surfaces of the housing 24, will corresponding switches 50 and 52 of the control or regulating device be closed so that a valve of the valve arrangement 44 closes and prevents a fluid flow between the first chamber 18 and the second chamber 20. Consequently, the position of the piston unit 4 is fixed. The valve arrangement [24] 44 may be configured either as a two-way valve 54 (FIG. 4a) or as a four-way valve 56 (FIG. 4b). The four-way valve 56 makes it possible to additionally connect a fluid compensation container 58 in order to avoid air in the fluid circuit or in the chambers 18, 20, respectively, in the case of possibly defective seals 14.

In addition to or alternatively to the first contact sensor 46 and the second contact sensor 48 it is possible to provide a third contact sensor 60 which detects whether the first end 22 of the piston unit 4 is in the original position. If this is the case, the third contact sensor 60 connects with the valve arrangement 44 and makes it possible to block the fluid flow into/out of the chambers 18, 20.

In addition, the control or regulating device may comprise a fluid pump which is connected to the first fluid connection 8 and/or the second fluid connection 10 and by means of which the piston 16 and, thus, the piston unit 4 may be displaced into a predetermined position. This makes it possible to deliberately move the tie rod 106 into one direction and, thus, to make it possible to actively steer the wheels 104.

Figure 5:
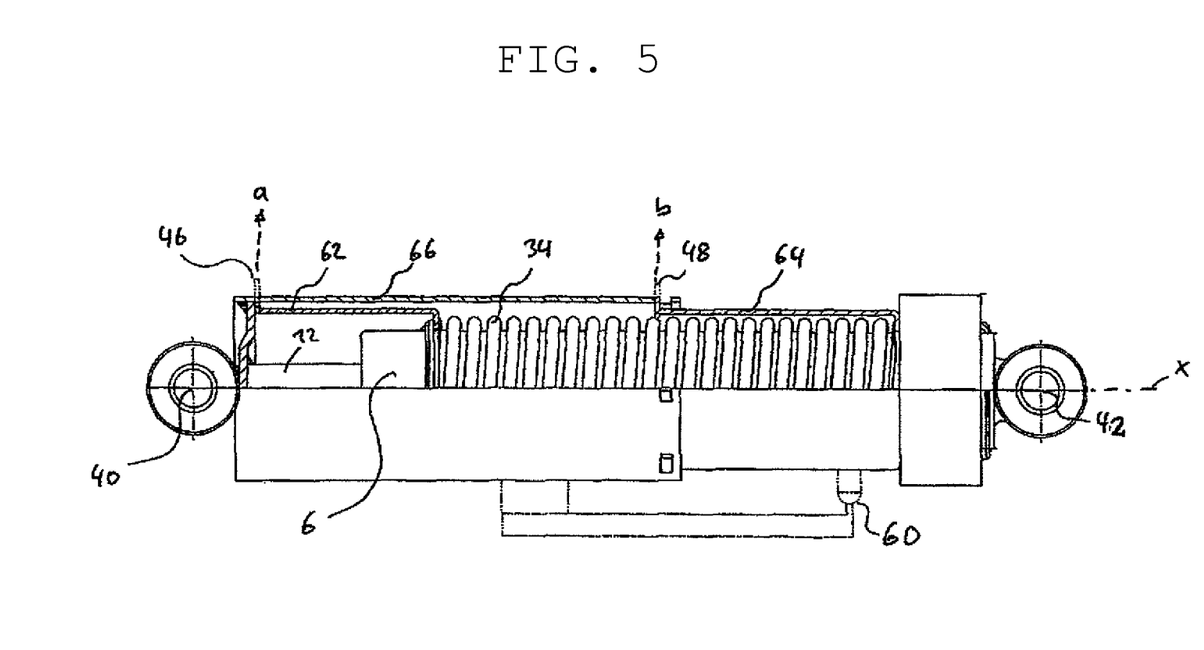
FIG. 5 is a cross-sectional view of a second embodiment of the stabilizing device according to the invention.

FIG. 5 shows a further embodiment of the stabilizing device according to the invention. In contrast to the stabilizing devices shown in FIGS. 2 and 3, the spring element 34 is not arranged in a separate housing but surrounds the hollow cylinder 6. At the first end 22 of the piston unit 4 there is arranged a first holding element 62 which, when the piston unit 4 is displaced in the direction of the retracted position, interacts with the first end 36 of the spring element 34 and compresses it. There is also provided a second holding element 64 which, when the piston unit 4 is displaced in the direction of the extended position, interacts with a second end 38 of the spring element 34 and compresses it. The second holding element 64 is indirectly connected to the first end 22 of the piston unit 4 via the shock absorber outer pipe 66.

Figure 6:
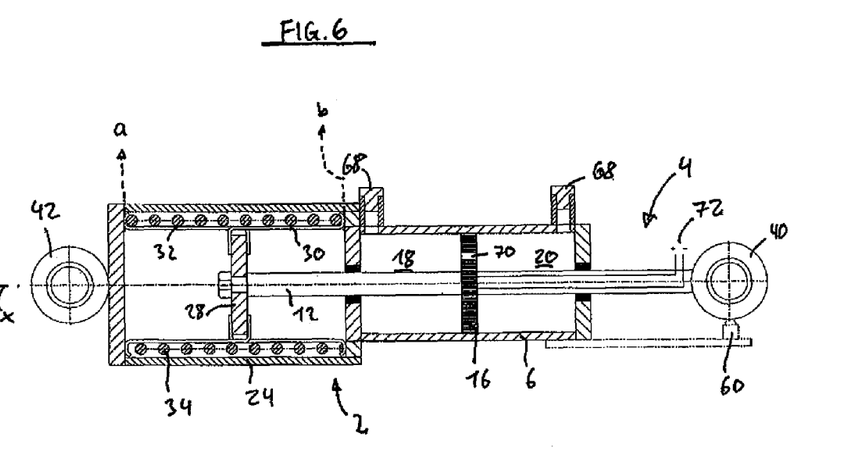
FIG. 6 is a cross-sectional view of a third embodiment of the stabilizing device according to the invention.

FIG. 6 shows a further embodiment of the stabilizing device according to the invention. Here, the first fluid connection 8 and the second fluid connection 10 are closed essentially fluid-tightly by caps 68. In the piston 16 of the piston unit 4 there is provided a through-hole 70 through with the fluid may flow between the first chamber 18 and the second chamber 20 when the piston unit 4 moves. Particularly preferably, in the hollow cylinder 6 or in the first and second chamber 18, 20, respectively, there is provided a fluid, the viscosity of which may change due to external influences. Said fluid may be a magnetorheological or an electrorheological liquid which increases its viscosity up to the solid state when a magnetic or electrical field is activated. When the vehicle reverses, it is thus possible to transmit to the piston 16 or to adjacent parts an electrical potential energy via electrical lines 72 such that an electrical field is applied to the fluid in the hollow cylinder 6 so that said fluid increases its viscosity. As a result, there is prevented a movement of the piston unit along the longitudinal axis X.

Figure 7:
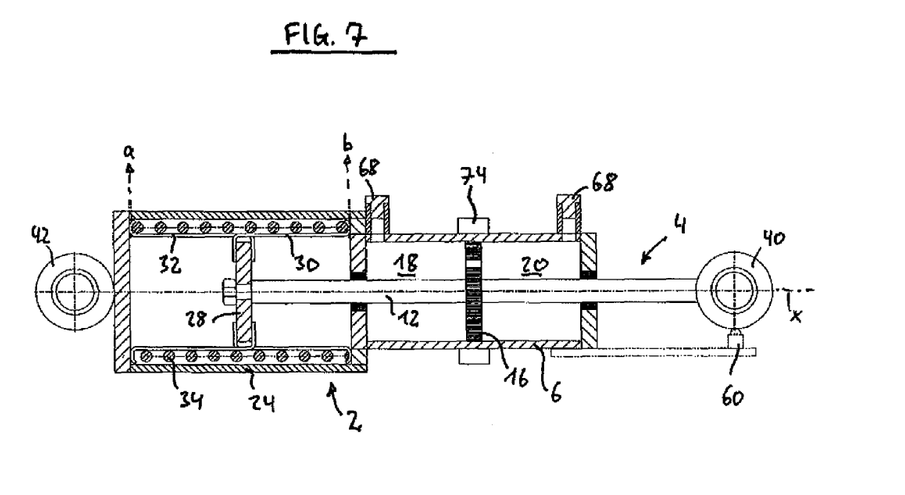
FIG. 7 is a cross-sectional view of a fourth embodiment of the stabilizing device according to the invention.

FIG. 7 shows a further exemplary embodiment of the stabilizing device according to the invention. In order to fix the piston unit 4 in the original position or zero position, there is provided an electromagnet 74 outside of the hollow cylinder or at the outer circumference thereof. Said electromagnet is positioned in the axial direction X such that it is arranged adjacent to the piston 16 and, thus, when it is activated, the piston 16 is held at the height of the electromagnet 74. As a matter or course, also a combination of the embodiment shown in FIGS. 6 and 7 is possible.

Figure 8:
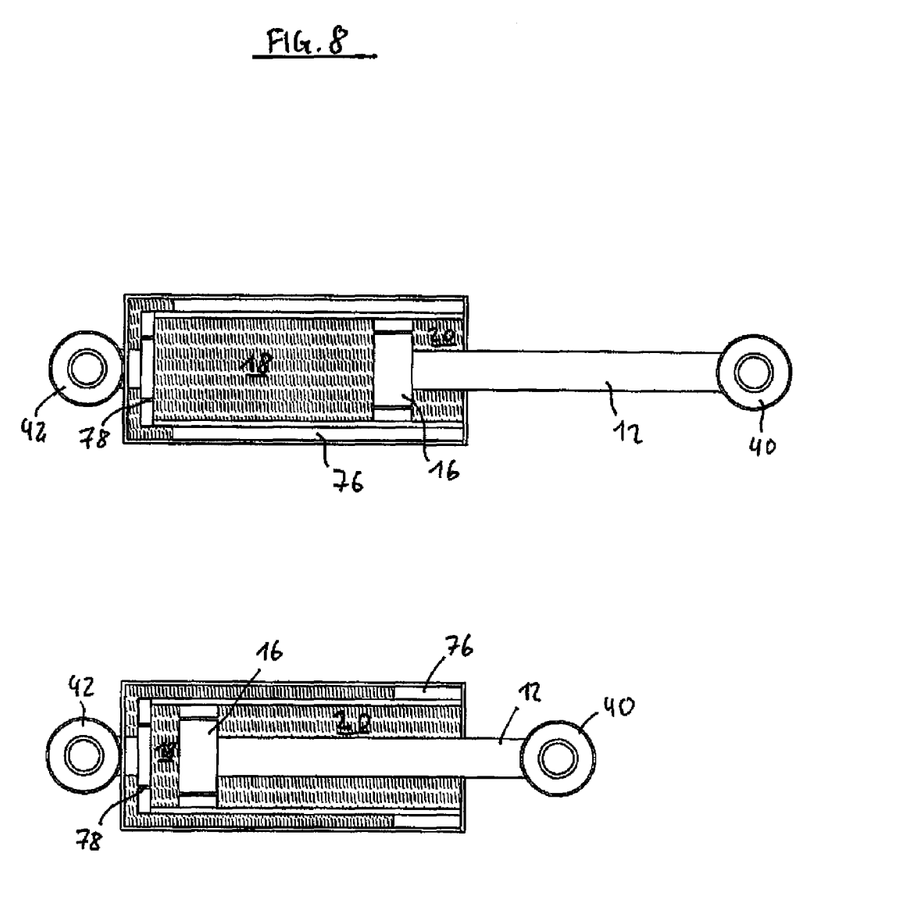
FIG. 8a is a cross-sectional view of a hollow cylinder unit according to the invention in an original position.
FIG. 8b is a cross-sectional view of a hollow cylinder unit according to the invention in an original position.

FIGS. 8a and 8b show an embodiment of a hollow cylinder 6 with a piston 16 arranged therein. As can be seen, the hollow cylinder 6 is configured essentially double-walled so as to form a third chamber 76. Between the first or second chamber 18, 20, respectively, and the third chamber 76, there is provided a floor valve arrangement 78 through which fluid may flow into the chamber 76 for the purpose of volume compensation when the piston unit 4 is displaced into the hollow cylinder 6. The floor valve arrangement 78 may be controlled by the control or regulating device such that it may prevent the fluid flow between the third chamber 76 and the first chamber 18. In this state, it is no longer possible to change the position of the piston rod 12 or of the piston unit 4, respectively, so that in this state the stabilizing device according to the invention serves as a steering lock. The embodiment shown in FIG. 8 may be employed in combination with one of the pre-tensioning devices shown in FIGS. 2-5.

The invention claimed is as follows:

1. A stabilizing device for axles of vehicles, such as motor vehicles, trailers, semi-trailers, or the like, comprising:
 a hollow cylinder unit which comprises a hollow cylinder containing a fluid therein;
 a piston unit with a piston which is arranged in the hollow cylinder and divides the hollow cylinder into at least two chambers, wherein the piston unit can slide relative to the hollow cylinder unit in that said piston unit can be moved from an original position to a deflected position;
 a pre-tensioning device which tensions the piston unit in the direction of the original position;
 a control device which controls the fluid flow into and out of the chambers; and
 a sensor device which detects the position of the piston unit,
wherein the control device comprises a valve arrangement that permits and prevents the fluid flow into and out of the chambers;
wherein the control device may prevent the fluid flow into and out of the chambers only when the sensor device detects the original position of the piston unit.

2. The stabilizing device according to claim 1, wherein the deflected position comprises a retracted position and an extended position.

3. The stabilizing device according to claim 2, wherein the control device comprises a fluid pump which is adapted to selectively feed fluid to one of the chambers in order to displace the piston unit into a predetermined position.

4. The stabilizing device according to claim 3, wherein the sensor device is adapted to detect a zero position of the pre-tensioning device.

5. The stabilizing device according to claim 4, wherein the pre-tensioning device comprises a spring element which preferably is configured as a coil spring.

6. The stabilizing device according to claim 5, wherein the spring element comprises a coil spring.

7. The stabilizing device according to claim 5, wherein the spring element is subject to pressure load in the retracted position and in the extended position.

8. The stabilizing device according to any one of claims 5 or 7, wherein in the retracted position the position of a first end of the spring element is displaced relative to the hollow cylinder unit, and in the extended position the position of a second end of the spring element is displaced relative to the hollow cylinder unit.

9. The stabilizing device according to claim 5, wherein the piston unit comprises a piston rod at which the piston is arranged and which at least at one end protrudes from the hollow cylinder.

10. The stabilizing device according to claim 9, wherein the piston rod includes a holding section at the protruding portion which, when the piston unit is displaced in the direction of the retracted position, is adapted to interact with a first holding element which is in engagement with the pre-tensioning device and, when the piston unit is displaced in the direction of the extended position, is adapted to interact with a second holding element which is in engagement with the pre-tensioning device.

11. The stabilizing device according to claim 2, wherein the control device comprises a fluid pump which is adapted to selectively feed fluid to one of the chambers in order to displace the piston unit into a predetermined position.

12. The stabilizing device according to claim 1, wherein the sensor device is adapted to detect a zero position of the pre-tensioning device.

13. The stabilizing device according to claim 1, wherein the pre-tensioning device comprises a spring element which preferably is configured as a coil spring.

14. The stabilizing device according to claim 13, wherein the spring element comprises a coil spring.

15. The stabilizing device according to claim 13, wherein the spring element is subject to pressure load in the retracted position and in the extended position.

16. The stabilizing device according to any one of claims 13 or 15, wherein in the retracted position the position of a first end of the spring element is displaced relative to the hollow cylinder unit, and in the extended position the position of a second end of the spring element is displaced relative to the hollow cylinder unit.

17. The stabilizing device according to claim 1, wherein the piston unit comprises a piston rod at which the piston is arranged and which at least at one end protrudes from the hollow cylinder.

18. The stabilizing device according to claim 17, wherein the piston rod includes a holding section at the protruding portion which, when the piston unit is displaced in the direction of the retracted position, is adapted to interact with a first holding element which is in engagement with the pre-tensioning device and, when the piston unit is displaced in the direction of the extended position, is adapted to interact with a second holding element which is in engagement with the pre-tensioning device.

19. The stabilizing device according to claim 1, wherein the hollow cylinder unit comprises a housing in which the pre-tensioning device is accommodated and is arranged coaxially with respect to the hollow cylinder.

* * * * *